United States Patent

[11] 3,595,161

[72] Inventor Wells A. Webb
 Berkeley, Calif.
[21] Appl. No. 868,680
[22] Filed Oct. 23, 1969
[45] Patented July 27, 1971
[73] Assignee Webbco Research & Development Corporation
 Berkeley, Calif.

[54] METHOD AND APPARATUS FOR REFUSE DISPOSAL
 14 Claims, 5 Drawing Figs.
[52] U.S. Cl. .................................................. 100/35,
 61/46.5, 114/28, 214/12, 214/152
[51] Int. Cl. .................................................. B65f 1/12,
 B30b 13/00
[50] Field of Search.......................................... 100/35, 70;
 214/12, 15, 13, 152; 61/35, 46, 46.5; 114/0.5, 28, 27

[56] References Cited
 UNITED STATES PATENTS
3,352,115 11/1967 Jurisich ......................... 61/46.5 X
3,395,663 8/1968 Smith ............................. 114/28
3,426,715 2/1969 Balbi ............................. 114/27
3,456,824 7/1969 Smith ............................. 214/152
3,490,812 1/1970 Uchida ........................... 214/12 X Primary Examiner—Peter Feldman
Attorney—Townsend and Townsend ABSTRACT: Method and apparatus for the disposal of solid waste material in which the refuse is transported out to sea to a disposal barge. The barge is provided with a large diameter telescoping pipe extending below the surface. The upper end of the pipe extends approximately 50 feet above the surface. The refuse is conveyed from the barge to the upper end of the pipe and discharged into the pipe. The accumulation of material in the pipe from the surface of the sea to the top of the pipe causes the material to be forced downward in the pipe until it reaches the 300 foot level below the surface. Water pressure at that level compresses virtually all of the refuse in the pipe so that it descends to the sea bottom. The end of the pipe is provided with a trap for any of the materials which will float even after being compressed at that depth.

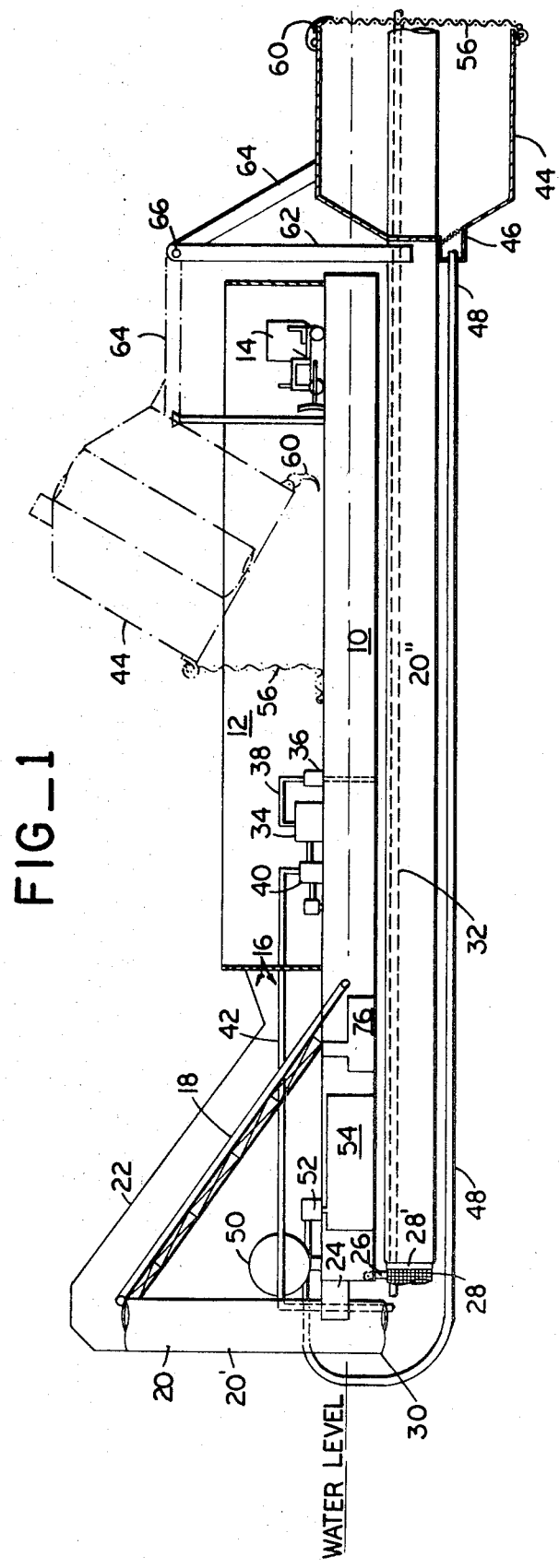
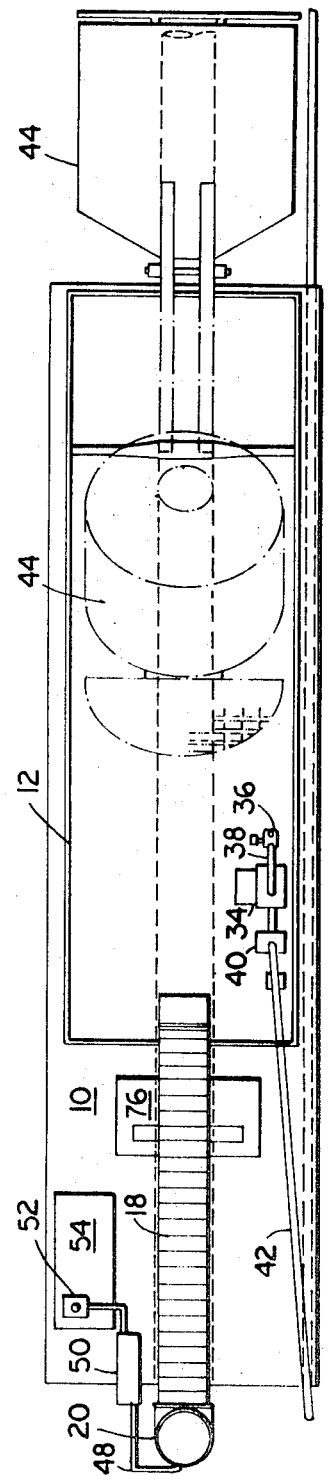

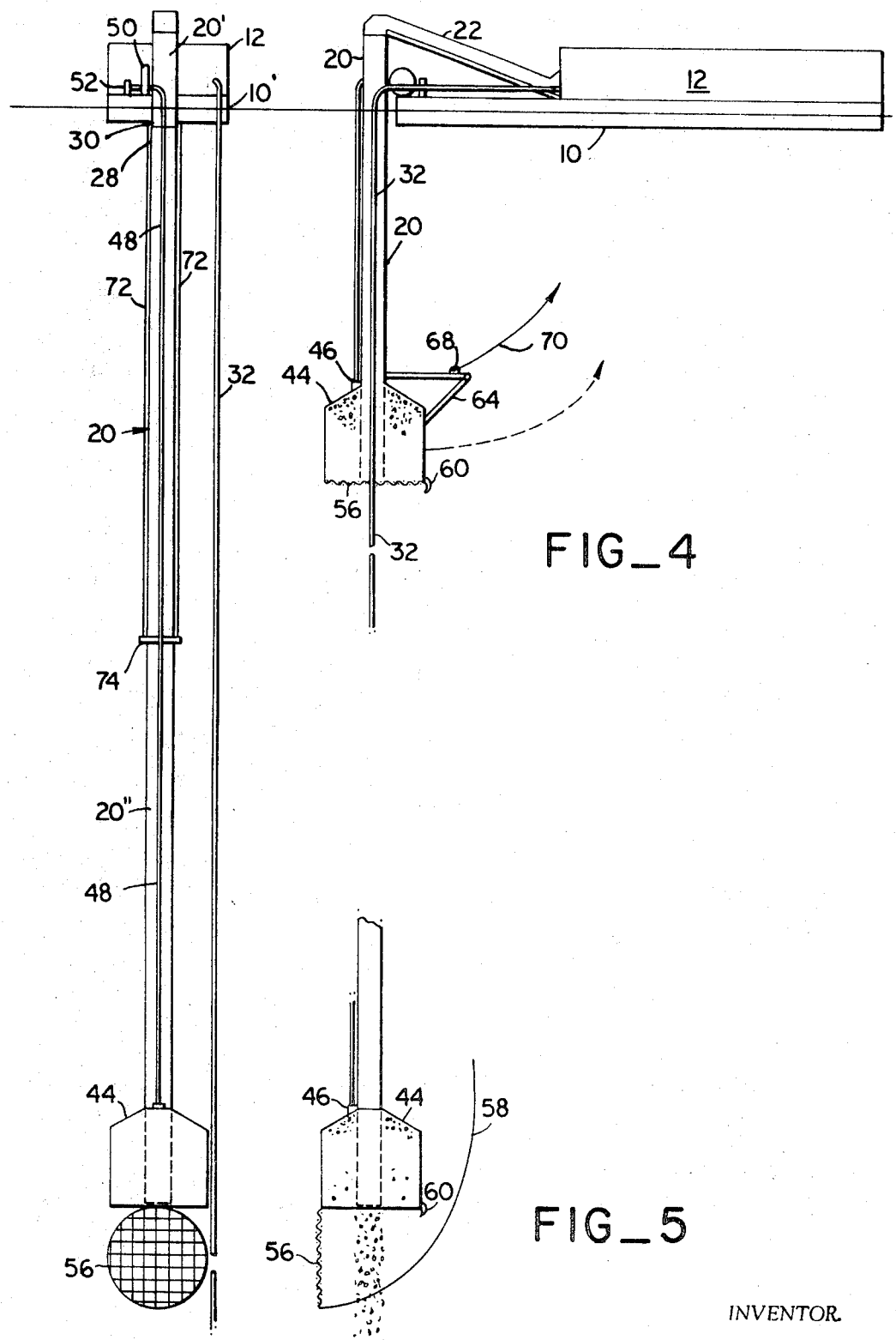

METHOD AND APPARATUS FOR REFUSE DISPOSAL

This invention relates to the disposal at sea of solid waste materials and, more particularly, to a method and apparatus for submerging such refuse in the sea so that the pressure of the sea water compresses the material causing it to lose its buoyancy and sink to the bottom.

The problem of solid waste disposal particularly from the increasingly large city population has become more and more acute. People have become increasingly aware that solid waste material cannot continue to be disposed in marsh lands and in other traditional "garbage dumps" because of the adverse effect on the land and water adjoining such disposal areas. Incineration which has been used heretofore is unsatisfactory because of the problems of air pollution from gases, ash and other pollutants.

The present invention is designed to overcome many of these problems by affording a convenient and inexpensive method and apparatus for the disposal of solid waste materials at sea. It has been the practice to carry solid waste materials some distance out to sea in open barges and there dump the material. A large proportion of such waste material is made up of kitchen discards, garden trimmings, wrapping material, bottles, cans, and discarded appliances, as well as the other accoutrements of modern day living, so that the aggregate density of such solid waste material is well above the density of sea water and as a result most of it will sink to the sea bottom when dumped. However, a large number of individual items of waste material are buoyant and will therefore float to the surface and, if the wind and tides are favorable, will be washed ashore to contaminate beaches, marinas, harbors and other shore-related activities.

There have been many proposals made for disposal of solid wastes in the sea including, for example, the use of an incinerator mounted on a ship in which the waste is reduced to ashes and the ashes dumped as shown in U.S. Pat. No. 2,442,686 and also the method shown in U.S. Pat. No. 3,426,712 in which the waste material is wrapped in wire netting and then dumped in the sea. Still another method is that shown in U.S. Pats. Nos. 3,456,824 and 3,395,663 in which solid waste material is placed in a container having a trap door bottom, the container lowered to a selected depth and held there and then the trap door is opened to dump the refuse on the sea bottom.

Each of the methods shown in the above-noted patents appear to have drawbacks making them impractical of accomplishment. In particular the two last mentioned U.S. Pats. Nos. 3,395,663 and 3,456,824 appear to be excessively cumbersome and slow moving and further appear to not provide for the collection and effective disposal of material which would not lose its buoyancy under pressure.

The present invention utilizes a large diameter pipe which extends to approximately 50 feet above the sea surface and approximately 300 feet below the surface. The refuse material is carried to the upper end of the pipe and loaded into the pipe. Some of the heavier material will immediately descend the length of the pipe and drop to the sea bottom but, since the refuse is of widely varied material, a substantial portion will remain on the surface and accumulate until it reaches a point near the top of the pipe. The weight of the material accumulated in the pipe will force the lowermost material down the pipe and, as more refuse is added at the top, the accumulated refuse will be forced downward toward the end of the pipe 300 feet below the surface. It has been found experimentally that typical refuse materials are rendered nonbuoyant at depths of from 50 feet to 260 feet. Thus, when the refuse materials have been forced to the 300 foot level below the surface they will have been sufficiently compressed to render substantially the entire mass of material at that level nonbuoyant thus causing it to sink directly to the bottom. When the refuse to be disposed by the method and using the apparatus of the present invention comprises the usual mixed household refuse the greatest proportion of the refuse will be compressed by the pressure of the sea water, rendered nonbuoyant, and will sink to the bottom. There will, however, be materials mixed into the refuse which will not be rendered nonbuoyant by the compression of the sea at the 300 foot level. Such materials include certain low density incompressible materials such as fats and fatty oils, waxes, polyethylene wrapping materials, polypropylene and unfilled rubber. Still another class of material which may be difficult to compress is wood fragments and in particular wood from the demolition of houses. In order to accommodate such incompressible materials and pieces of wood, provision is made in the present invention for a trap surrounding the bottom of the pipe. This trap will catch any materials which might tend to float back to the surface. The more solid material will remain in the trap until the discharge pipe is raised. The smaller pieces of buoyant material caught in the trap together with any liquids less dense than sea water will be pumped to the surface through a hose or pipe adjacent the main refuse pipe for disposal in the boiler of a steam generator or a similar device on the barge supporting the refuse disposal pipe.

As has been noted, the disposal of pieces of wood, particularly from demolition of houses, poses a more serious problem since cellular structure of the wood is such that compression is often difficult. Therefore, in accordance with the present invention, a separate, smaller diameter tube would be utilized for the disposal of demolition material. This tube would be fed a mixture of water and wood chips from a chipper machine connected with a pump. The small diameter tube would extend to depth in the order of 600—700 feet below the surface. This slurry of water and wood chips would be forced downward in the smaller diameter pipe and, when the slurry has reached a depth of approximately 600 feet the water pressure would be sufficient to crush substantially the entire mass of wood chips so that the chips would completely lose their buoyancy and sink to the sea bottom.

In accordance with the present invention the large diameter pipe for the usual refuse would be made to telescope so that the pipe could be raised for towing the barge back to port should that be necessary. The pipe would also be hingedly connected to the barge to accommodate the wave-induced motion between the pipe and the barge itself. The hinge connection on the main pipe also permits the pipe to be raised to empty the buoyant materials trap affixed to the pipe when that trap becomes full.

In order to ensure a steady flow of solid material down the large diameter pipe, water may be added at sea level, and the solid waste and water together will flow down the pipe.

IN THE DRAWINGS

The objects, features and advantages of the present invention will be more apparent after referring to the following specification and accompanying drawings in which:

FIG. 1 is a side elevational view of the disposal apparatus mounted on a barge;

FIG. 2 is a top plan view of the barge;

FIG. 3 is an end view showing the main refuse pipe descending to working depth below the sea;

FIG. 4 is a side view of the barge in which the main refuse pipe has been partially elevated; and FIG. 5 is a fragmentary view of the end of the disposal pipe showing the trap housing and the discharge of compressed refuse.

Referring now more particularly to the drawings in which the same reference numerals refer to identical parts in each of the several views, the waste disposal apparatus is mounted on a large barge 10. A steel walled enclosure 12 is mounted on the barge to form a well into which waste material from lighters or other transport means may be dumped. Such transport means are well known and form no part of the present invention. A conventional tractor or bulldozer 14 is provided to move the refuse along the well to the entrance 16 to conveyor apparatus 18. The conveyor apparatus 18 will pick up the refuse material pushed thereon by the bulldozer and raise it to the top of the large diameter waste disposal pipe 20 suspended on the front end of the barge 10. The conveyor 18 is covered by enclosure 22 so that a minimum amount of waste material will be blown from the apparatus into the sea.

The waste disposal pipe 20 comprises an upper section 20' and a lower section 20''. The upper section 20' is rigidly affixed to the barge by means of a mounting bracket 24. The lower portion 20'' of the pipe is affixed to mounting hinge 26 to permit the lower section to pivot from a position aligned with the upper section 20' of the disposal pipe to a position parallel to the bottom of the barge as is illustrated in FIG. 1 and to permit some movement between the barge and the pipe. The upper portion 28 of the lower pipe 20'' is provided with a screen area 28' to permit it to pass water into the pipe to mix with the solid waste. Portion 28 is engaged in the lower end 30 of pipe 20' to form a continuous waste disposal chamber extending from a point approximately 50 feet above the water surface to a point some 300 feet below the surface. It is preferred to have this chamber of the same diameter everywhere, or of slightly larger diameter in the descending direction to avoid locations where the waste material might wedge and stop. The waste disposal pipe is shown interconnected and extending extending below the barge in FIG. 3.

In addition to the large diameter pipe 20 which has already been described there is also provided a considerably smaller diameter pipe 32 which descends adjacent the main pipe 20 to a depth substantially below the end of the main pipe 20. This small diameter pipe 32 is used for the forcing of a slurry of water and wood chips to a point some 600 feet below the surface where the wood chips will become compressed sufficiently so that they lose their buoyancy and sink to the sea bottom. The wood material is fed into a pulper 34 where it is broken up into small pieces. Sea water is fed into the pulper by pump 36 through pipe 38. From the pulper, the slurry of chips and water is pumped by pump 40 through feed pipe 42 to the main section of the small disposal pipe 32 to be forced down by the pump pressure to the previously mentioned depth.

Affixed to the end of the large diameter pipe 20 is a bell-shaped trap housing 44 for trapping and holding those pieces of refuse which are not sufficiently compressed by the water pressure to become nonbuoyant at the depth at the end of the pipe. A small sump 46 is formed at the top of the bell housing to further trap oil, fats and similar liquid materials which in any event would not be compressed. The sump 46 is drained by means of a hose 48 connected to a reel 50 so that the hose may be retracted when the pipe 20 is telescoped upward preparatory to moving the pipe to a position parallel to the bottom of the barge as shown in FIG. 1. From the reel the hose is connected to a pump 52 which draws the oil, fat and other liquid material from the sump 46 and conveys it to a tank 54 on the barge for storage and disposal either by burning in a steam generator on the barge or by carrying the material back to shore for recovery or other disposal.

The bottom of the trap housing 44 is normally open when refuse is being dumped down the open chamber 20. When the trap is to be raised for emptying, the bottom must be closed in order to retain all the floating material therein as the trap is raised. Closing of the trap is accomplished by means of a screen 56 which may be pulled closed by cable 58 attached to a winch mounted on the barge. When the screen 56 is brought to the approximately horizontal position it is held in place by means of latch 60 mounted on the trap housing. The trap housing 44 is not solidly affixed to the pipe 20'' but rather is hingedly mounted on a support arm 62 affixed to the pipe 20''. A swing arm 64 is hinged at the upper end 66 of the support arm 64 so that the entire trap housing 44 may be pivoted from the horizontal position as shown in FIG. 1 to a position as shown by the broken lines in FIG. 1 to dump the buoyant materials which have accumulated therein. A cable bracket 68 is provided on the support arm for connecting to a cable 70 for pivoting the trap and the pipe to the horizontal position.

The pipe 20 is made up of a number of large sections designed to fit one within the other in order to permit the pipe to telescope into a short enough unit to rest under the length of the vessel 10. The telescoping of the pipes may be accomplished by means of a cable or cables 72 attached to a mounting ring 74 on the pipes and connected to a powerful winch 76. The winch will pull on the cables 72 thus lifting the lower section of pipe and telescoping it to permit the entire section of pipe to be rotated on hinge 26 into a horizontal position under the vessel 10.

The operation of the method and apparatus of the present invention is as follows. The mixed refuse is loaded into the well 12 on the barge or other floating vessel 10. The refuse is pushed into position adjacent the conveyor 18 and from there carried up to the top of the disposal pipe 20. The refuse drops into the pipe and falls to the water level which, in the preferred embodiment, is approximately 50 feet from the top of the disposal pipe 20. Some of the refuse will sink down through the pipe and drop to the bottom of the sea while other material will remain floating. The refuse will be piled higher and higher within the disposal pipe and as the material accumulates its weight will force the bottom of the formerly floating material under the surface of the sea and downward in the pipe. As refuse continues to be piled into the upper end of the pipe the material on the bottom of the refuse heap within the pipe or chamber will continue to be forced downward until it reaches a depth at or before the end of the pipe at which it is compressed to such an extent that it is rendered nonbuoyant. The compressed waste will then pass out of the pipe and fall to the sea bottom. This process continues as long as refuse continues to be loaded into the top of the disposal chamber. As has previously been noted, substantially the same method of waste disposal may be used in connection with wood from building demolition. Since wood chips may require greater pressure in order to become nonbuoyant the present invention utilizes the combination of a chipper or pulper together with a pump to make a slurry of sea water and the wood chips, which slurry is then forced into a small diameter pipe. In the preferred embodiment this pipe is approximately 14 inches in diameter and extends to a depth of approximately 700 feet. At this depth the wood chips are sufficiently compressed by the pressure of the water that they are rendered substantially nonbuoyant and therefore will sink to the sea bottom.

At the conclusion of the operation, pipe 20 may be cleaned of floating waste material by dropping down pipe 20 heavy objects such as sand, bricks or concrete blocks which may have previously been segregated out of the load for this purpose.

While one embodiment of the invention has been shown and described, it will be obvious that other adaptations and modifications can be made without departing from the true spirit and scope of the invention.

I claim:

1. Apparatus for refuse disposal at sea comprising an elongate vertical refuse disposal chamber, said chamber mounted on a floating vessel and extending a substantial distance above the surface of the sea and extendible to a depth below the surface at which the water pressure is sufficient to compress substantially all refuse in the chamber at that depth so that such refuse becomes nonbuoyant, and loading means for placing refuse in the disposal chamber at the upper end thereof.

2. The apparatus of claim 1 wherein the chamber is open at the bottom thereof and including trap means mounted at the lowermost portion of the chamber for collecting refuse which is not rendered nonbuoyant, and means for raising the trap means for discharge of the collected refuse.

3. The apparatus of claim 2 and including means connected with the trap means for collecting liquid waste material caught in the trap means, and means for removing the liquid waste from the collection means and storing the liquid waste for disposal.

4. The apparatus of claim 2 and including means for enclosing the buoyant waste in the trap means to prevent escape of the buoyant waste when the trap is raised.

5. The apparatus of claim 1 and including means for admitting sea water into the chamber near the surface of the sea.

6. A method for the disposal of solid waste material at sea comprising the steps of placing the waste into an open ended chamber the top of which is substantially above the surface of the sea and the bottom of which extends to a depth below the surface at which the water pressure will render the waste substantially nonbuoyant, and continuing to add waste in order to compress the waste and force it down the chamber towards the bottom thereof.

7. The waste disposal method of claim 6 including the step of collecting adjacent the bottom of the chamber any buoyant waste material which exits from the chamber.

8. The waste disposal method of claim 6 and including the step of accumulating any liquid waste which exits from the chamber, removing the liquid waste accumulation, and then storing the liquid waste for later disposal.

9. The waste disposal method of claim 6 wherein the placing of the waste material is into a closed chamber by means of a pump.

10. The waste disposal method of claim 6 and including the step of adding sea water to the chamber to mix with the waste material about at the level of the sea surface.

11. Apparatus for waste disposal at sea comprising a large diameter pipe mounted on a barge, said pipe extending about 50 feet above the surface of the sea and having a portion thereof extendible to a depth of about 300 feet below the surface, conveyor means for conveying refuse to the top of the pipe and depositing the refuse therein, means for raising and lowering the extendible portions of the pipe, a closeable housing at the lowermost portion of the pipe for collecting waste matter which would float to the surface, means for raising the housing to the surface to permit discharge and collection of the waste material therein, and flexible means for removing liquid wastes from the housing and conveying them to a storage container.

12. The apparatus of claim 11 and wherein the extendible portion of the pipe is pivotally mounted on the barge to accommodate movement of the barge caused by wave motion and to permit storage of that portion adjacent the barge and including means to pivot the extendible portion of pipe from the vertical to the horizontal position adjacent the barge.

13. The apparatus of claim 11 and wherein the closeable housing is pivotally mounted at the lower end of the extendible pipe to permit movement thereof to a position above the surface of the sea when the extendible pipe is substantially horizontal so that the housing may be opened and the collected waste material therein discharged.

14. The apparatus of claim 11 wherein the extendible pipe may be lowered to a depth of at least 600 feet and including means for breaking up large pieces of woody waste material, means for combining the broken up pieces with water, and means for pumping the mixture of wood pieces and water under sufficient pressure to force the mixture to the bottom of the extendible pipe when it is fully extended.